(12) United States Patent
Paliswiat et al.

(10) Patent No.: US 8,161,496 B2
(45) Date of Patent: Apr. 17, 2012

(54) POSITIVE AND NEGATIVE EVENT-BASED TESTING

(75) Inventors: Bartosz Henryk Paliswiat, Kirkland, WA (US); Yasser Mufti, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1295 days.

(21) Appl. No.: 11/831,812

(22) Filed: Jul. 31, 2007

(65) Prior Publication Data

US 2009/0037937 A1    Feb. 5, 2009

(51) Int. Cl.
  *G06F 3/00*    (2006.01)
  *G06F 9/44*    (2006.01)
  *G06F 9/46*    (2006.01)
  *G06F 13/00*    (2006.01)

(52) U.S. Cl. ........................................................ 719/318
(58) Field of Classification Search ................... 719/318
  See application file for complete search history.

(56) References Cited

U.S. PATENT DOCUMENTS

| | | | |
|---|---|---|---|
| 4,817,027 A * | 3/1989 | Plum et al. | 708/443 |
| 5,355,484 A | 10/1994 | Record et al. | |
| 6,134,676 A | 10/2000 | Vanhuben et al. | |
| 6,353,896 B1 | 3/2002 | Holzmann et al. | |
| 6,651,204 B1 | 11/2003 | Rajsuman et al. | |
| 6,742,166 B2 | 5/2004 | Foster et al. | |
| 7,089,517 B2 | 8/2006 | Yamoto et al. | |
| 2003/0126506 A1 | 7/2003 | Lin | |
| 2006/0036910 A1 | 2/2006 | Fung et al. | |
| 2006/0052965 A1 | 3/2006 | Nodwell | |
| 2006/0277534 A1 * | 12/2006 | Kasuya | 717/143 |
| 2007/0074166 A1 | 3/2007 | Overturf et al. | |

OTHER PUBLICATIONS

Bates, Peter C., "Debugging Heterogeneous Distributed Systems Using Event-Based Models of Behavior," Dated Feb. 1995, pp. 1-31.
Beer, et al., "Issues in Testing Dependable Event-Based Systems at a Systems Integration Company," Dated May 9, 2007 pp. 1-2.

* cited by examiner

*Primary Examiner* — Emerson Puente
*Assistant Examiner* — Kimbleann Verdi
(74) *Attorney, Agent, or Firm* — L. Alan Collins; Collins & Collins Intellectual, LLC

(57) ABSTRACT

Technologies for performing positive and negative event-based testing of systems such as software and the like. Such technologies may be applied to any type of system for which activities and state changes and the like can be monitored. Event monitors are typically established to monitor each type of event of interest, including negative events. Such event monitors detect corresponding system activity, state changes, and the like and describe such as events that are placed in an event queue. The present invention provides technologies and methods for comparing these events to expected events, thus enabling positive testing. Such expected events may be expected to occur sequentially (one after another in a specified order) or in parallel (multiple events wherein the order of the events is irrelevant) or any combination of the two. Further, unexpected events are noted as well, thus enabling negative testing.

19 Claims, 16 Drawing Sheets

POSITIVE AND NEGATIVE EVENT-BASED TESTING

BACKGROUND

Testing the operation of complex systems, including software, can be time-consuming and costly and is often limited to end-result verification. Even if some testing of intermediate steps is performed, negative testing is rarely carried out, such as making sure no changes have occurred in a file system or registry or other element of the system. Yet verifying that certain activities or state changes did not occur can be critical to effective testing.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for performing positive and negative event-based testing of systems such as software and the like. Such technologies may be applied to any type of system for which activities and state changes and the like can be monitored. Event monitors are typically established to monitor each type of event of interest, including negative events. Such event monitors detect corresponding system activity, state changes, and the like and describe such as events that are placed in an event queue. The present invention provides technologies and methods for comparing these events to expected events, thus enabling positive testing. Such expected events may be expected to occur sequentially (one after another in a specified order) or in parallel (multiple events wherein the order of the events is irrelevant) or any combination of the two. Further, unexpected events are noted as well, thus enabling negative testing.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 2 is a block diagram illustrating a portion of the example test method and showing an initial state of the event comparison engine.

FIG. 3 is a block diagram illustrating a portion of the example test method and showing the arrival of example event E0 and operations of an example Expect (E0) method invocation.

FIG. 4 is a block diagram illustrating a portion of the example test method and showing operations of an example Parallel method invocation responsive to completion of the previous method invocation.

FIG. 5 is a block diagram illustrating a portion of the example test method and showing arrival of an example E3 event and operations of an example Expect (E1) method invocation responsive to completion of the previous method invocation.

FIG. 6 is a block diagram illustrating a portion of the example test method and showing arrival of an example E2 event.

FIG. 7 is a block diagram illustrating a portion of the example test method and showing arrival of an example E1 event.

FIG. 8 is a block diagram illustrating a portion of the example test method and showing operations of an example Expect (E2) method invocation responsive to completion of the previous method invocation.

FIG. 9 is a block diagram illustrating a portion of the example test method and showing operations of an example Sequence method invocation responsive to completion of the previous method invocation.

FIG. 10 is a block diagram illustrating a portion of the example test method and showing operations of an example Expect (E3) method invocation responsive to completion of the previous method invocation.

FIG. 11 is a block diagram illustrating a portion of the example test method and showing arrival of an example E4 event and operations of an example Expect (E4) method invocation responsive to completion of the previous method invocation.

FIG. 12 is a block diagram illustrating a portion of the example test method and showing operations of an example End method invocation corresponding to a previous Sequence method invocation and responsive to completion of the previous method invocation.

FIG. 13 is a block diagram illustrating a portion of the example test method and showing operations of an example End method invocation corresponding to a previous Parallel method invocation and responsive to completion of the previous method invocation.

FIG. 14 is a block diagram illustrating a portion of the example test method and showing arrival of an example E5 event and operations of an example Expect (E5) method invocation responsive to completion of the previous method invocation.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
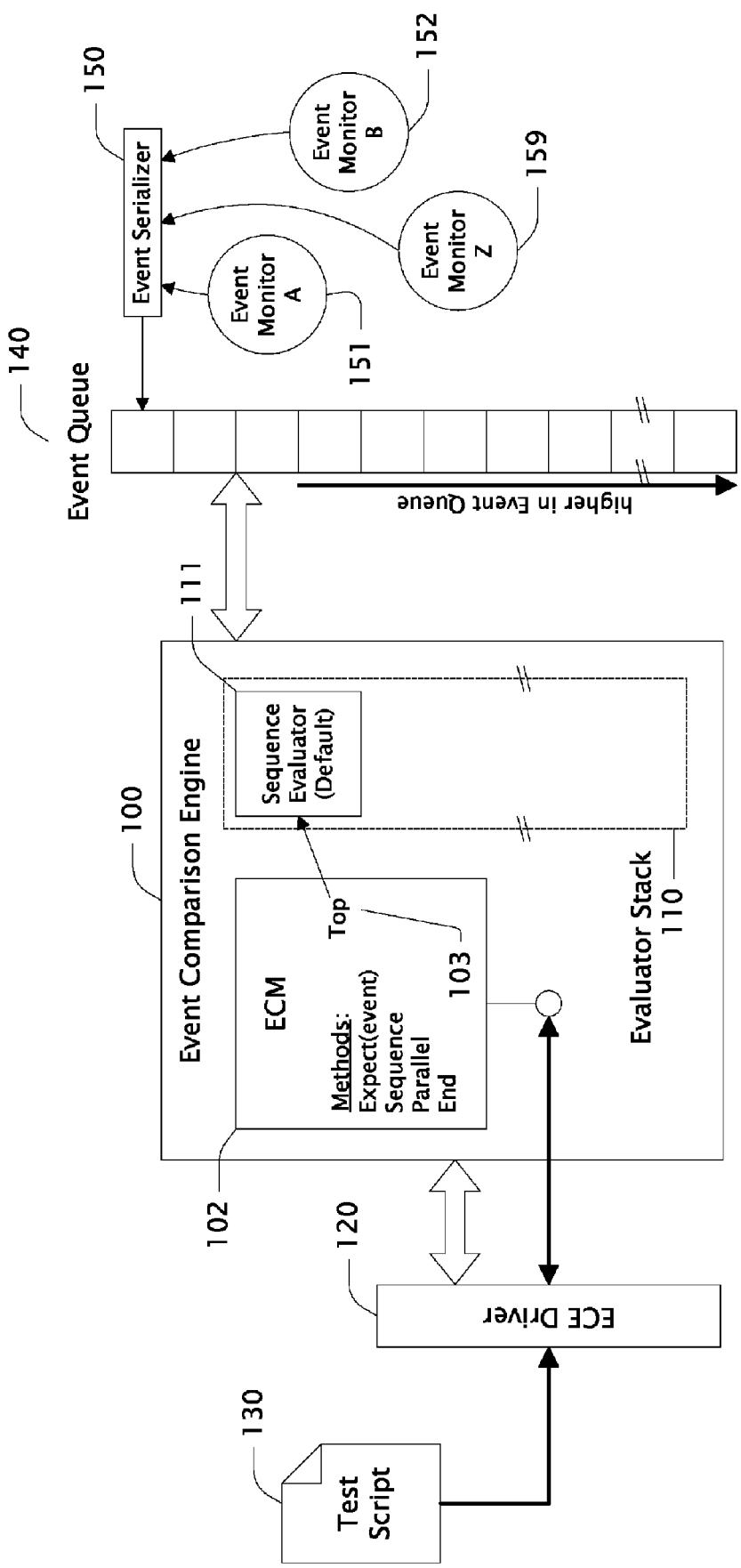
FIG. 1 is a block diagram showing an example event comparison engine.

FIG. 1 is a block diagram showing an example event comparison engine 100. In one example, event comparison engine ("ECE") 100 is comprised of event comparison manager ("ECM") 102 and evaluator stack ("EVS") 110. ECM 102 supports at least four methods: Expect (event), Sequence, Parallel, and End. Evaluator stack 110 supports at least two types of evaluators: sequence evaluators and parallel evaluators. In this example, EVS 110 is provisioned with default sequence evaluator 111. Additional evaluators may be pushed on to and later popped off of evaluator stack 110 with the top evaluator typically being the evaluator that inspects event queue 140 for expected events. Other methods and/or evaluators may alternatively or additionally be supported.

As used herein, the term "method" typically refers to computer-executable instructions that are associated with a class or object such as in object-oriented programming. The term "method" may additionally and/or alternatively refer to computer-executable instruction any form such as a subroutine, function, process, application, driver, program, or the like, and/or any combination thereof. Such methods may be conventionally "invoked" or "called" or the like.

ECM 102 methods are typically called by ECE driver 120 or the like. Such a driver may be any system or software or combination thereof or the like suitable for interacting with ECE 100, invoking ECM 102 methods, and accepting return information and the like from ECE 100 typically resulting from the method's operations. Such a driver typically operates in connection with a test script, such as test script 130, which may be used to drive ECE 100 via ECE driver 120. In one example, a test script is a program or the like, typically written in any suitable programming language, used to test part or all of the functionality of a target system. A test script typically includes and/or reads one or more test cases, which are typically written descriptions of the testing to be performed by the test script. ECE driver 120 and test script 130 may be combined into a single entity. Test cases may be provided as files or the like.

The system to be tested, or target system, typically includes event monitors such as event monitors 151, 152, and 159. Such event monitors monitor various aspects of the target system and are operable to convert activity and/or changes in the state of the target system into events. Event monitors may be created for monitoring any aspect of a target system, such as a file system monitor (monitors activity and/or changes in the state of a file system), a registry monitor (monitors activity and/or changes in the state of a registry), user interface monitor (monitors aspects of the user interface including inputs and outputs), performance monitor (monitors performance activity such as CPU usage, memory usage, and the like). Event monitors may be created for any element, aspect, or parameter of interest in testing a target system. In one example, event monitors feed events as they occur into an event serializer 150 which typically collects events from a plurality of monitors and passes the events in a temporal order to event queue 140.

Event serializer 150 typically collects events from a plurality of monitors, such as monitors 151, 152, and 159, and passes the events to event queue 140. Events are typically serialized in a temporal order at the event serializer 150 before being fed into event queue 140. An event typically includes a unique event identifier ("ID") that may be used to distinguish the class of the event, such as a file system event, a registry event, and so forth. Each unique event typically includes additional data ("event data") such as data describing the event. For example, the event data for a file system event may include an operation indicator (such as read, write, create, delete, or the like) and a path string identifying a file that the operation applied to. Event data typically includes a time stamp indicating the date and time or the like that the event took place. As an event arrives at event queue 140, a notification may be provided to ECE 100 indicating the arrival of a new event. Alternatively or additionally, ECE 100 may poll event queue 140 for new event arrivals.

In one example, ECE 100 operates by comparing an event and its data in event queue 140 with an expected event as specified to ECM 102 via event script 130 and ECE driver 120. The various methods of ECM 102 are invoked specifying expected events and, at completion of the invoked method, ECM 102 returns a success or failure indication based on the events and their data discovered in event queue 140. In general, if an arrived event matches the event type expected, and the event data of interest corresponds to the expected event, then an indication of success is returned. If such a matching event does not arrive within a time-out period, then an indication of failure is returned. In one example, the time-out period for a typical expected event may be one minute. Alternatively, a custom time-out value may be specified for any expected event. Any failure indication may result in failure of the corresponding test case.

In general, invoking method Expect (event) of ECM 102 typically causes ECE 100 to inspect event queue 140 for an event type matching that of the event parameter. Further, a test of other event data indicated by the event parameter or the like may also be performed. Event queue 140 is typically inspected by whatever evaluator is currently on the top of evaluator stack 110 of ECE 100; this would be default sequence evaluator 111 if no other evaluator has been pushed onto the stack 110. The event parameter typically includes an event ID as may include other event data. If a matching event is found in event queue 140, then Expect (event) typically returns a success indication and marks the matching event as "matched" in event queue 140. If the expected event does not arrive at event queue 140 prior to the expiration of the time-out period, then ECE 100 typically returns a failure indication. The term "expected event" as used herein typically refers to some anticipated or expected activity or state change or the like in a target system represented as an event in an event queue that can be described via an event parameter of an Expect ( ) method or the like. The term "unexpected event" as used herein typically refers to some activity or state change or the like in a target system represented as an event in an event queue that is not anticipated or expected.

In general, evaluators include a "parent" pointer (e.q., FIG. 4, element 404; and FIG. 9, elements 104 and 904), a "base" pointer, and an "end" pointer. When a new evaluator is pushed on to evaluator stack 110, its parent pointer is set to point to the evaluator that was previously at the top of the stack. The parent pointer of the first evaluator on stack 110, typically default sequence evaluator 111, may be set to indicate no parent, such as being set to a negative number (such as −1). The end pointer of an evaluator, including default sequence evaluator 111, is initially set to indicate that the next expected event has not yet arrived in event queue 140. In one example of the foregoing, the end pointer is set to a negative value (such as −1). The base pointer of default sequence evaluator 111 is typically set to point to the first position in event queue 140. An additional evaluator pushed on to evaluator stack 110 typically has its base pointer initially set to point to the event queue 140 position indicated by the base pointer of its parent evaluator. Further, ECM 102 includes a "top" pointer 103 that typically points to the evaluator on the top of evaluator stack 110. Evaluators are typically pushed on to and popped off of evaluator stack 110 via the Sequence, Parallel, and End methods or the like. Given a subsequent invocation of the Expect (event) method, the evaluator on the top of stack 110 inspects event queue 140 for an event corresponding to the expected event as specified by the event parameter of an Expect (event) method call.

In general, invoking the Sequence method of ECM 102 causes ECE 100 to push a new sequence evaluator onto evaluator stack 110. The new sequence evaluator will typically remain at the top of the stack until popped off the stack by a call to a corresponding End method call or until another evaluator is pushed on to the stack above it. A sequence evaluator is typically operable to inspect the position in event queue 140 at its base pointer for an event corresponding to that specified by an Expect (event) method invocation. The sequence evaluator will typically continue to inspect event queue 140 until a matching event is detected or until a time-out value has been reached. If a non-matching event is detected, the base pointer is typically moved to the next position of event queue 140. If a matching event is detected, a success indication is returned, the matching event is marked, the end pointer is set to the position in event queue 140 containing the matching event, and the base pointer is set to the position in event queue 140 following the matching event.

In general, invoking the Parallel method of ECM 102 causes ECE 100 to push a new parallel evaluator onto the evaluator stack 110. The new parallel evaluator will typically remain at the top of the stack until popped off the stack by a call to a corresponding End method call or until another evaluator is pushed onto the stack above it. A parallel evaluator is typically operable to inspect positions in event queue 140 down to and including the base pointer position for an event corresponding to that specified by an Expect (event) method call. The parallel evaluator will typically continue to inspect event queue 140 until a matching event is detected, or until a time-out value has been reached. If a matching event is detected, a success indication is returned, the matching event is marked, and if the matching event is higher in event queue 140 that any previous matching event for this particular parallel evaluator then the end pointer is set to the position in event queue 140 containing the matching event, otherwise the end pointer remains unchanged.

In general, invoking the End method of ECM 102 causes ECE 100 to pop the top evaluator off of the evaluator stack 110, thus returning control to the parent evaluator of the popped evaluator. Further, pointers of the parent evaluator are typically updated based on those of the popped, or child, evaluator. For example, if the parent evaluator is a parallel evaluator, then the parent's end pointer is typically set to point to the same position in event queue 140 pointed to by the child's end pointer. If the parent evaluator is a sequence evaluator, then the parent's base pointer is typically set to point to the position in event queue 140 following that pointed to by the child's end pointer, and the parent's end pointer is typically set to point to the same position in event queue 140 pointed to by the child's end pointer. Default sequence evaluator 111 typically remains on stack 110 and is not popped off.

Other ECM 102 methods that may be supported include a an ExpectNothing(time) method. In general, when method an ExpectNothing(time) is invoked then ECE 100 expects no events to occur for the duration specified in the time parameter. If any events arrive at event queue 140 during the specified duration, then a failure indication is returned.

FIGS. 2 through 14 illustrate an example test method and show a series of block diagrams of the example event comparison engine 100 of FIG. 1 inspecting the example event queue 140 based on an example test script or list 200. Example test script 200 is expressed in FIGS. 2 through 14 as a list 200 of ECM 102 method invocations; normal font indicates that the method has not yet been invoked; bold font indicates that the method has been invoked. Event queue 140 is shown including a plurality of positions for arriving events such as positions 141-147. A first event typically arrives at the front of event queue 140, at position 141. Example test script 200 may be expressed as follows:

$$(E0 \rightarrow (E1, E2, (E3 \rightarrow E4)) \rightarrow E5)$$

The above expression and test script or list 200 both indicate that event E0 is expected first. After event E0, then events E1 and E2 and a sequence of events E3 followed by E4 are expected in parallel. That is, events E1, E2, and sequence (E3→E4) may occur in any order relative to each other; that is wherein the order of the events is irrelevant. Within the sequence (E3→E4) event E3 is expected before event E4. Note that a sequence indicates that the events in the sequence are expected in the order listed. Following the parallel events (E1, E2, and sequence (E3→E4)), then event E5 is expected. In the example test method, ECE 100 may be testing a hypothetical target system for compliance with test script 200. Further, ECE 100 detects any unexpected events that arrive at event queue 140 that are not expected per test script 200, as particularly described in connection with FIG. 15.

Figure 2:
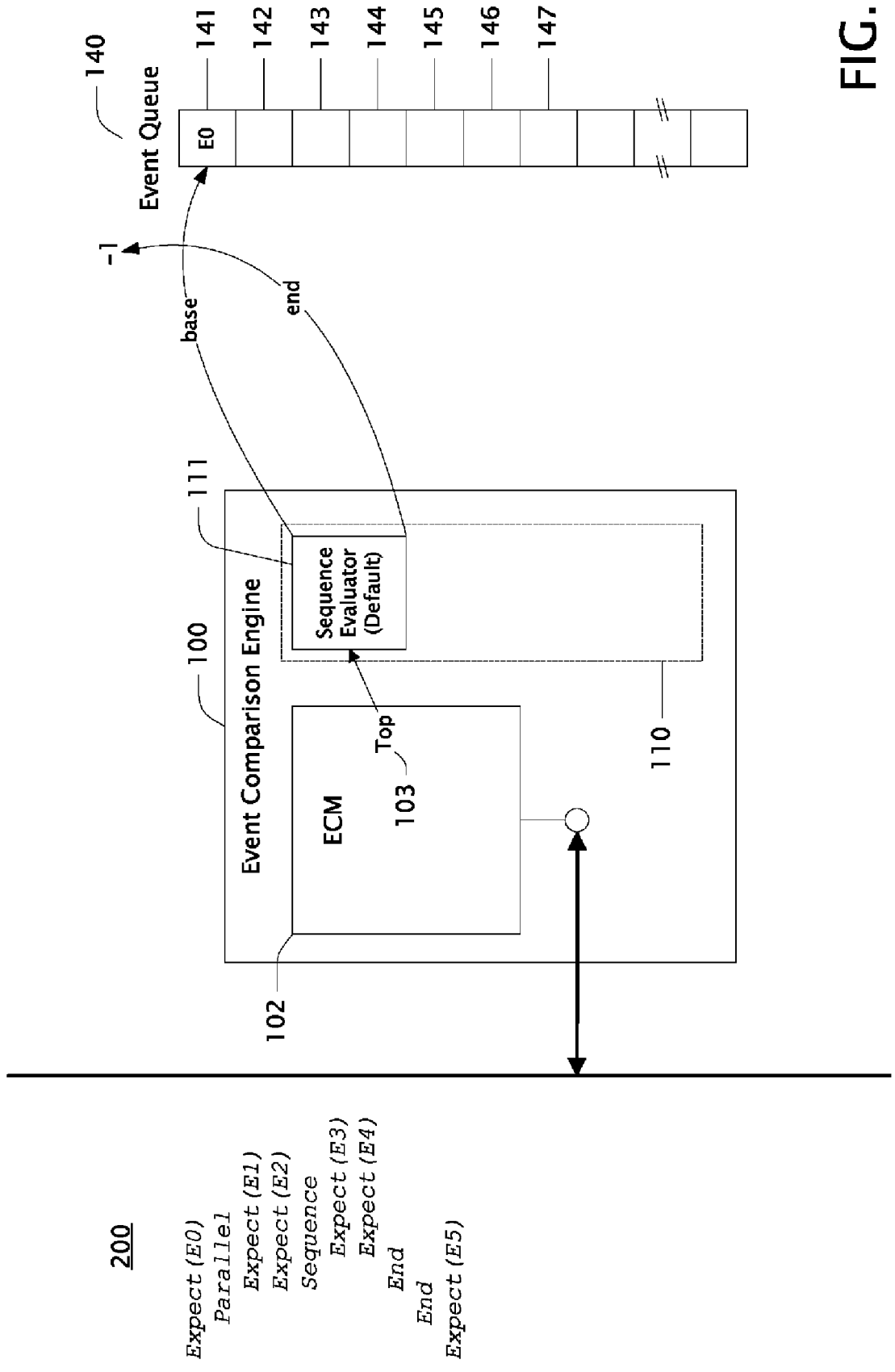
FIGS. 2 through 14 illustrate an example test method and show a series of block diagrams of the example event comparison engine of FIG. 1 inspecting the example event queue based on an example test script or list.

FIG. 2 is a block diagram illustrating a portion of the example test method and showing an initial state of the event comparison engine 100. Evaluator stack 110 is shown initialized with default sequence evaluator 111 with its base pointer set to position 141, the first position of event queue 140, and its end pointer set to a negative value indicating no matching event has yet been found in event queue 140. List 200 includes no bold text indicating no methods have yet been invoked. Arriving event E0 (not part of the initial state of the event comparison engine 100) is shown in position 141 of event queue 140. Finally, ECM 102 top pointer 103 points to the top (and presently the only) evaluator on evaluator stack 110, the default sequence evaluator 111. The example test method typically continues as described in connection with FIG. 3.

Figure 3:
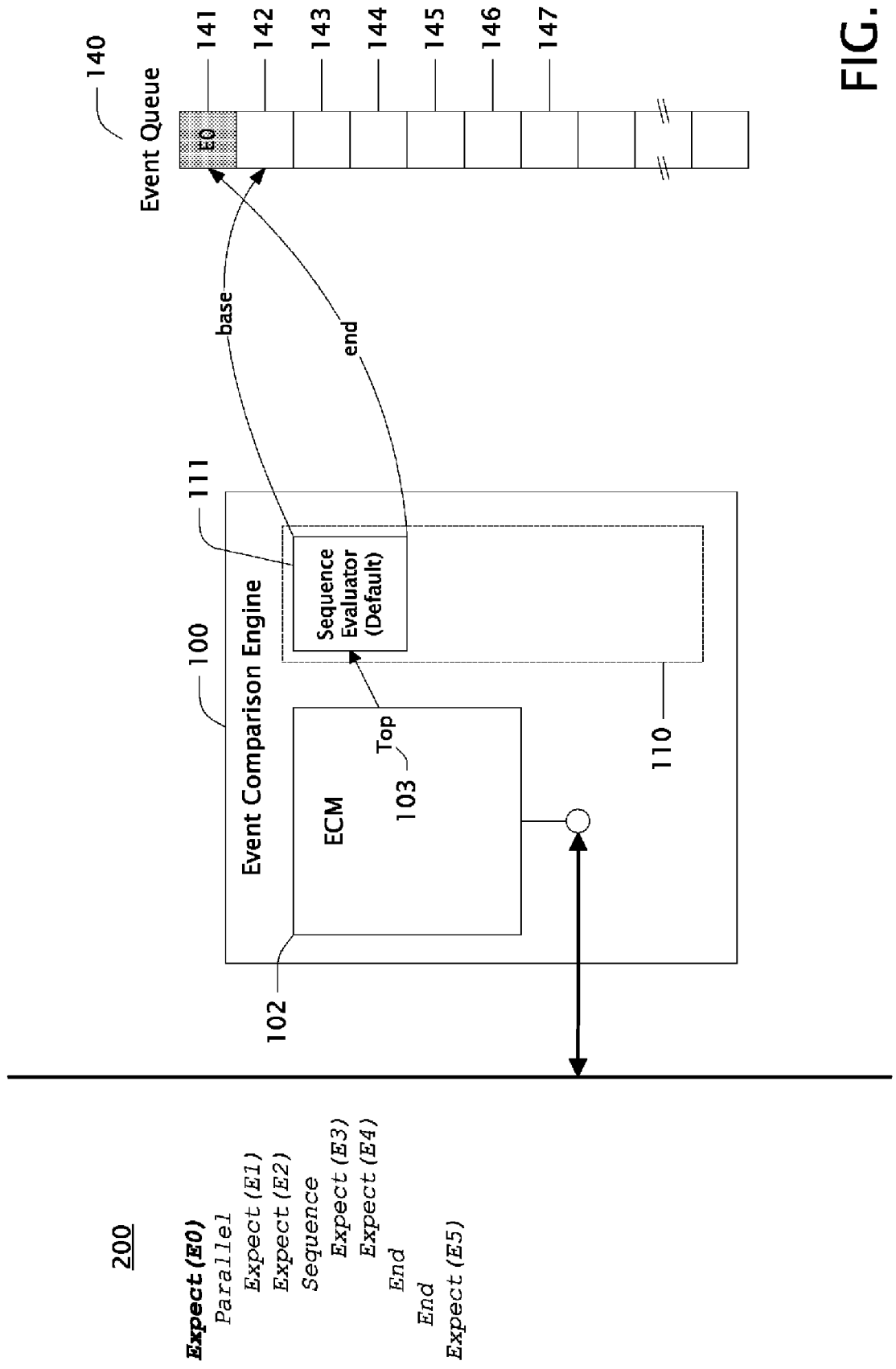

FIG. 3 is a block diagram illustrating a portion of the example test method and showing the arrival of example event E0 and operations of an example Expect (E0) method invocation. Note that the Expect (E0) line of list 200 is bold indicating the method invocation. Accordingly, sequence evaluator 111 finds matching event E0 at position 141 of event queue 140. Given the matching event, the end pointer of sequence evaluator 111 is set to point to position 141, the position of matching event E0, and the base pointer of sequence evaluator 111 is set to point to the position following that of the end pointer, position 142. Further, matching event E0 at position 141 is marked as matching, as indicated by the gray shading in position 141. Finally, ECE 100 typically returns a success indicator to its caller indicating that matching event E0 was found corresponding to the Expect (E0) call, thus completing the Expect (E0) method invocation. The example test method typically continues as described in connection with FIG. 4.

In general, when a sequence evaluator is pushed onto an evaluator stack, including the default sequence evaluator, the end pointer of the sequence evaluator is set to a negative value indicating that a matching event has not yet been found on the event queue. The based pointer of the sequence evaluator is typically set to point to the same position in the event queue as that of the base pointer of the sequence evaluator's parent evaluator or, in the case of the default sequence evaluator, the base pointer is set to point to the first position in the event queue.

Each time a new evaluator of any type (sequence or parallel) is pushed onto the evaluator stack then a top pointer of the event comparison engine is set to point to the new top evaluator and a parent pointer of the new top evaluator is set to point to the previous top evaluator. When a matching event is found in the event queue by the sequence evaluator, the end pointer of the sequence evaluator is typically set to point to the position of the matching event in the event queue and base pointer of the sequence evaluator is typically set to point to the position in the event queue following that of the end pointer.

Figure 4:
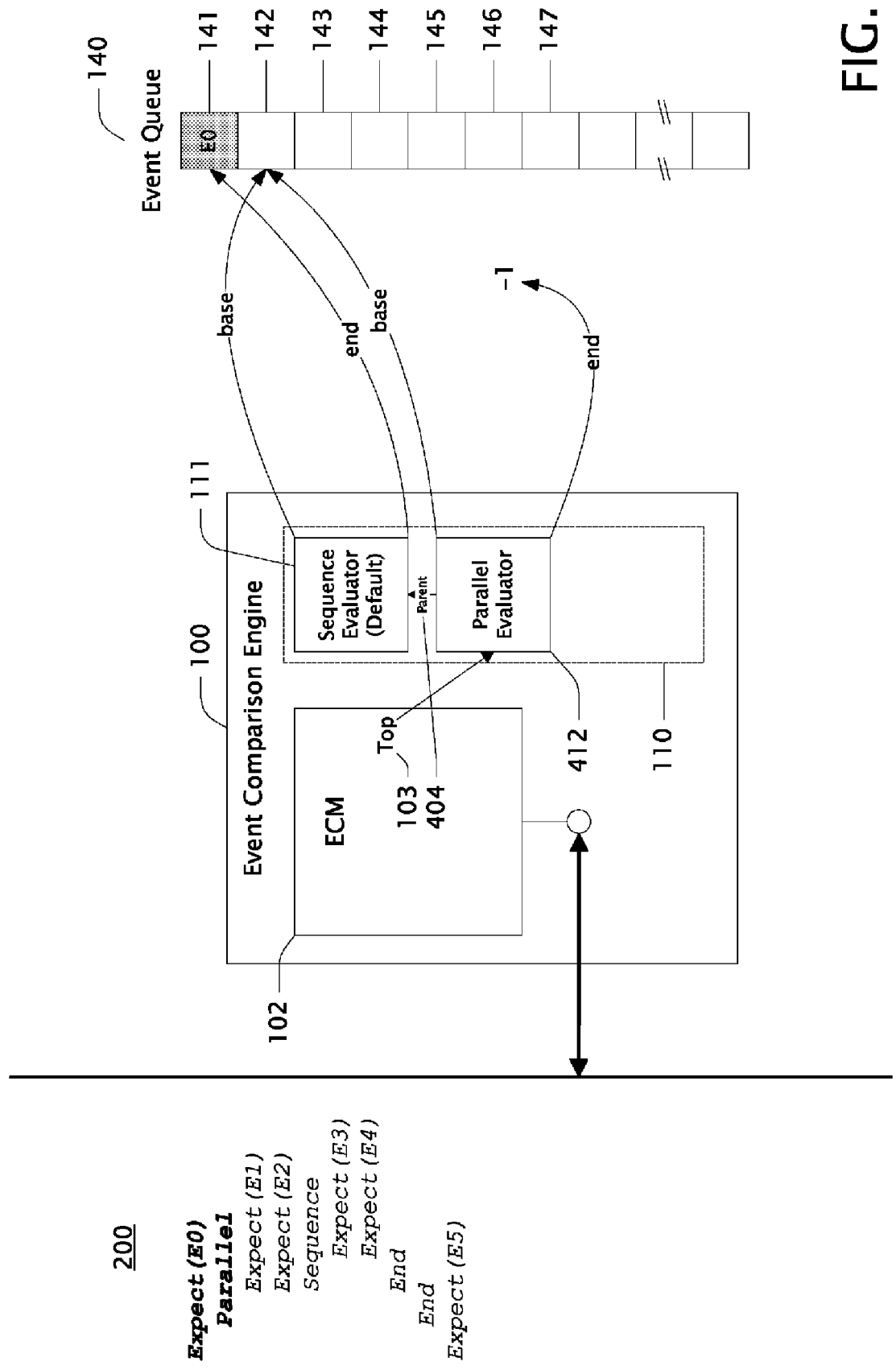

FIG. 4 is a block diagram illustrating a portion of the example test method and showing operations of an example Parallel method invocation responsive to completion of the previous method invocation. Note that the Parallel line of list 200 is bold indicating the method invocation. Accordingly, parallel evaluator 412 is pushed onto evaluator stack 110 and top pointer 103 is set to point to evaluator 412. Also, the parallel evaluator's parent pointer 404 is set to point to parent evaluator 111. Also, the base pointer of parallel evaluator 412 is set to the same position as the base pointer of its parent evaluator, position 142 in this example. Further, the parallel evaluator's end pointer is set to a negative value indicating no matching event as yet. Finally, ECE 100 typically returns a success indicator upon completion of the Parallel method. The example test method typically continues as described in connection with FIG. 5.

Figure 5:
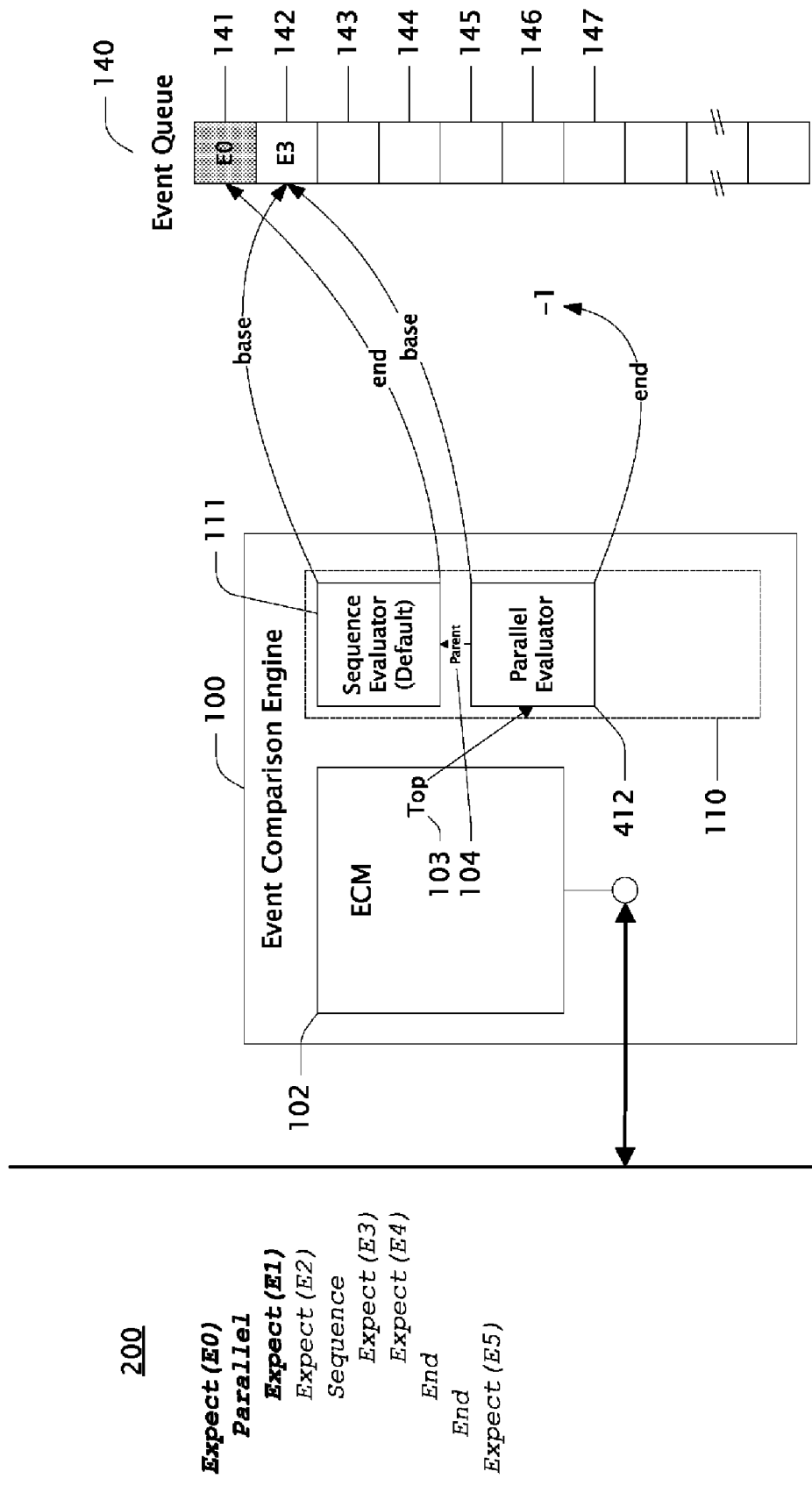

FIG. 5 is a block diagram illustrating a portion of the example test method and showing arrival of an example E3 event and operations of an example Expect (E1) method invocation responsive to completion of the previous method invocation. Note that the Expect (E1) line of list 200 is bold indicating the method invocation. Also, as shown in FIG. 5, event E3 (as opposed to the expected E1) has arrived at position 142, the next available position in event queue 140. Responsive to the method invocation, ECE 100 inspects event queue 140 for a matching event E1 but does not find it, therefore all evaluator pointers remain unchanged. Note that events E1, E2, and sequence (E3→E4) are expected in parallel and may occur in any order. ECE 100 is currently expecting E1 of the possible parallel events. The example test method typically continues as described in connection with FIG. 6.

Figure 6:
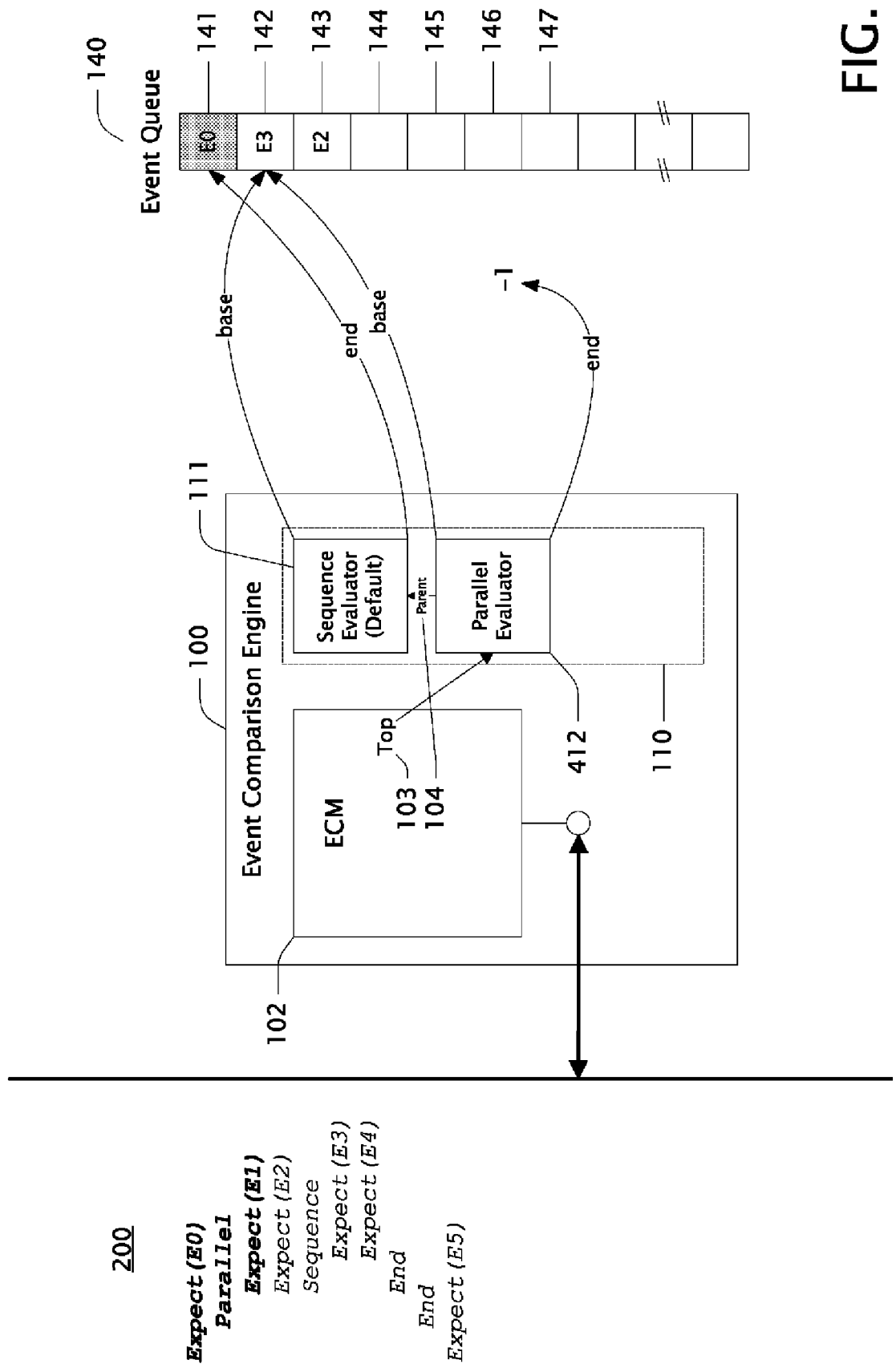

FIG. 6 is a block diagram illustrating a portion of the example test method and showing arrival of an example E2 event. The E2 event has arrived at position 143, the next available position in event queue 140. ECE 100 is currently expecting event E1 but still does not find it, therefore all evaluator pointers remain unchanged. Note that events E1, E2, and sequence (E3→E4) are expected in parallel and may occur in any order. ECE 100 is currently expecting E1 of the possible parallel events. The example test method typically continues as described in connection with FIG. 7.

Figure 7:
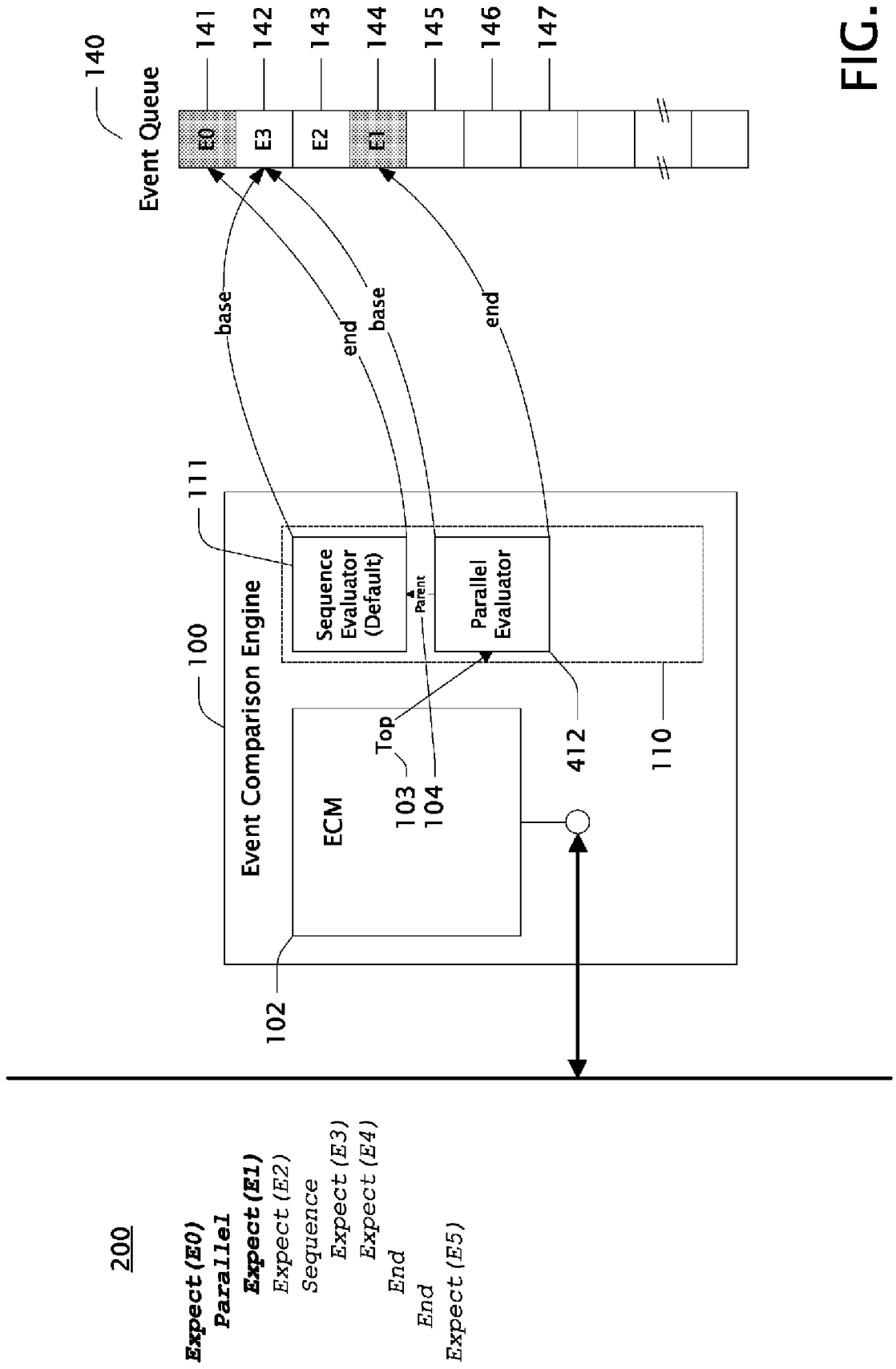

FIG. 7 is a block diagram illustrating a portion of the example test method and showing arrival of an example E1 event. The E1 event has arrived at position 144, the next available position in event queue 140. Accordingly, parallel evaluator 412 finds matching event E1 at position 144. Given the matching event, the end pointer of parallel evaluator 412 is set to point to position 144, the position of matching event E1. The base pointer of parallel evaluator 412 remains unchanged. Further, matching event E1 at position 144 is marked as matching, as indicated by the gray shading in position 144. Finally, ECE 100 typically returns a success indicator to its caller indicating that matching event E1 was found corresponding to the Expect (E1) call, thus completing the Expect (E1) method invocation. The example test method typically continues as described in connection with FIG. 8.

In general, when a parallel evaluator is pushed onto an evaluator stack the end pointer of the parallel evaluator is set to a negative value indicating that a matching event has not yet been found on the event queue. The base pointer of the parallel evaluator is typically set to point to the same position in the event queue as that of the base pointer of the parallel evaluator's parent evaluator. When a matching event is found in the event queue by the parallel evaluator and the end pointer of the parallel evaluator is set to a negative value then the end pointer is typically set to point to the position of the matching event in the event queue and the base pointer of the parallel evaluator typically remains unchanged. If the end pointer of the parallel evaluator is already set to a position in the event queue, then it typically remains unchanged.

Figure 8:
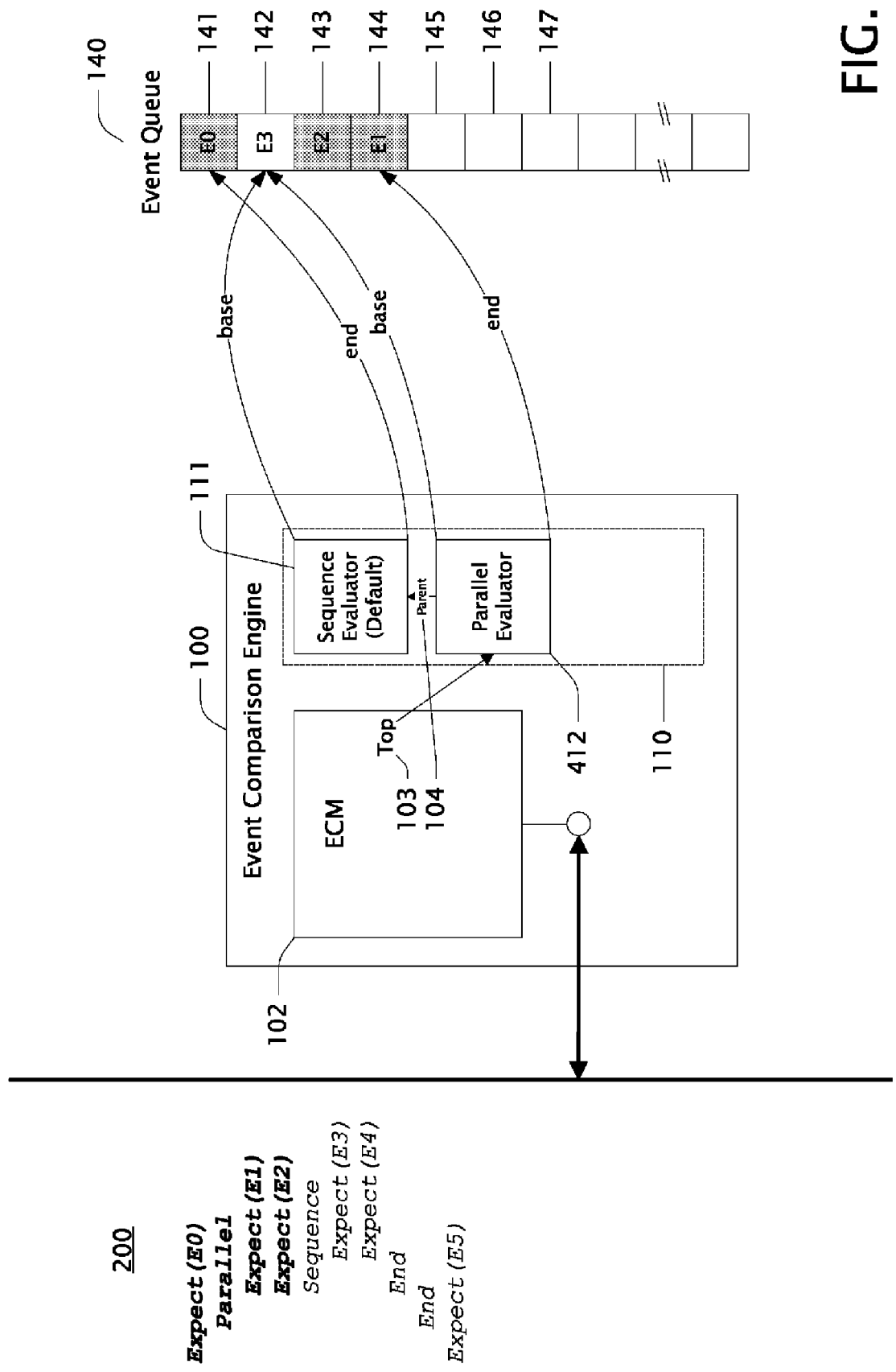

FIG. 8 is a block diagram illustrating a portion of the example test method and showing operations of an example Expect (E2) method invocation responsive to completion of the previous method invocation. Note that the Expect (E2) line of list 200 is bold indicating the method invocation. Accordingly, ECE 100 inspects event queue 140 and finds matching event E2 at position 143. Given the matching event, matching event E2 at position 143 is marked as matching, as indicated by the gray shading in position 143. The base and end pointers of parallel evaluator 412 remain unchanged; the base pointer typically remains unchanged from its initial setting and the end pointer typically remains unchanged when already set to a position in event queue 140. Finally, ECE 100 typically returns a success indicator to its caller indicating that matching event E2 was found corresponding to the Expect (E2) call, thus completing the Expect (E2) method invocation. The example test method typically continues as described in connection with FIG. 9.

Figure 9:
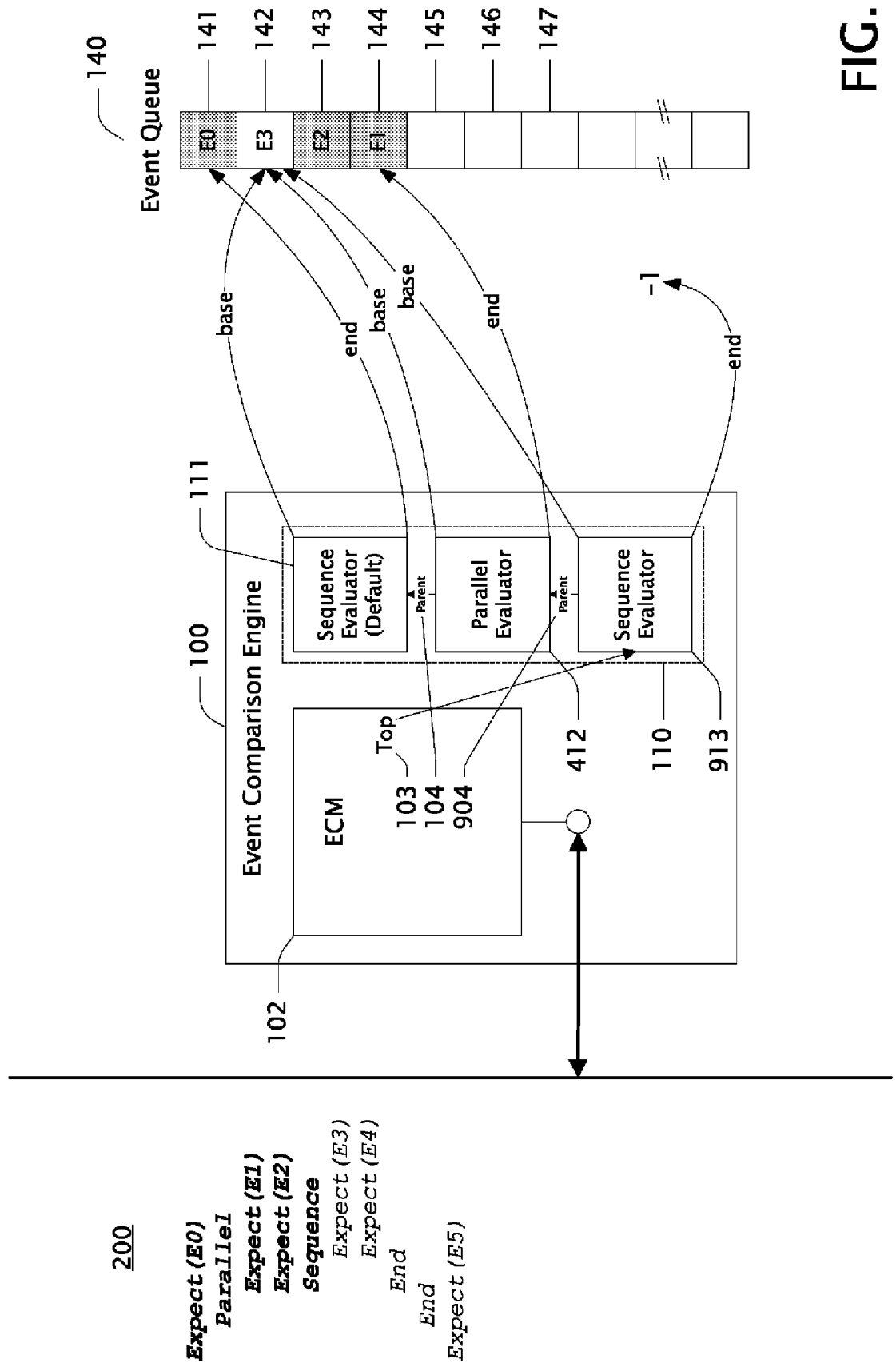

FIG. 9 is a block diagram illustrating a portion of the example test method and showing operations of an example Sequence method invocation responsive to completion of the previous method invocation. Note that the Sequence line of list 200 is bold indicating the method invocation. Accordingly, sequence evaluator 913 is pushed onto evaluator stack 110 and top pointer 103 is set to point to evaluator 913. Also, sequence evaluator 913's parent pointer 904 is set to point to parent evaluator 412. Also, the base pointer of sequence evaluator 913 is set to the same position as the base pointer of the parent evaluator, or position 142 in this example. Further, sequence evaluator 913's end pointer is set to a negative value indicating no matching event as yet. Finally, ECE 100 typically returns a success indicator upon completion of the Sequence method. The example test method typically continues as described in connection with FIG. 10.

Figure 10:
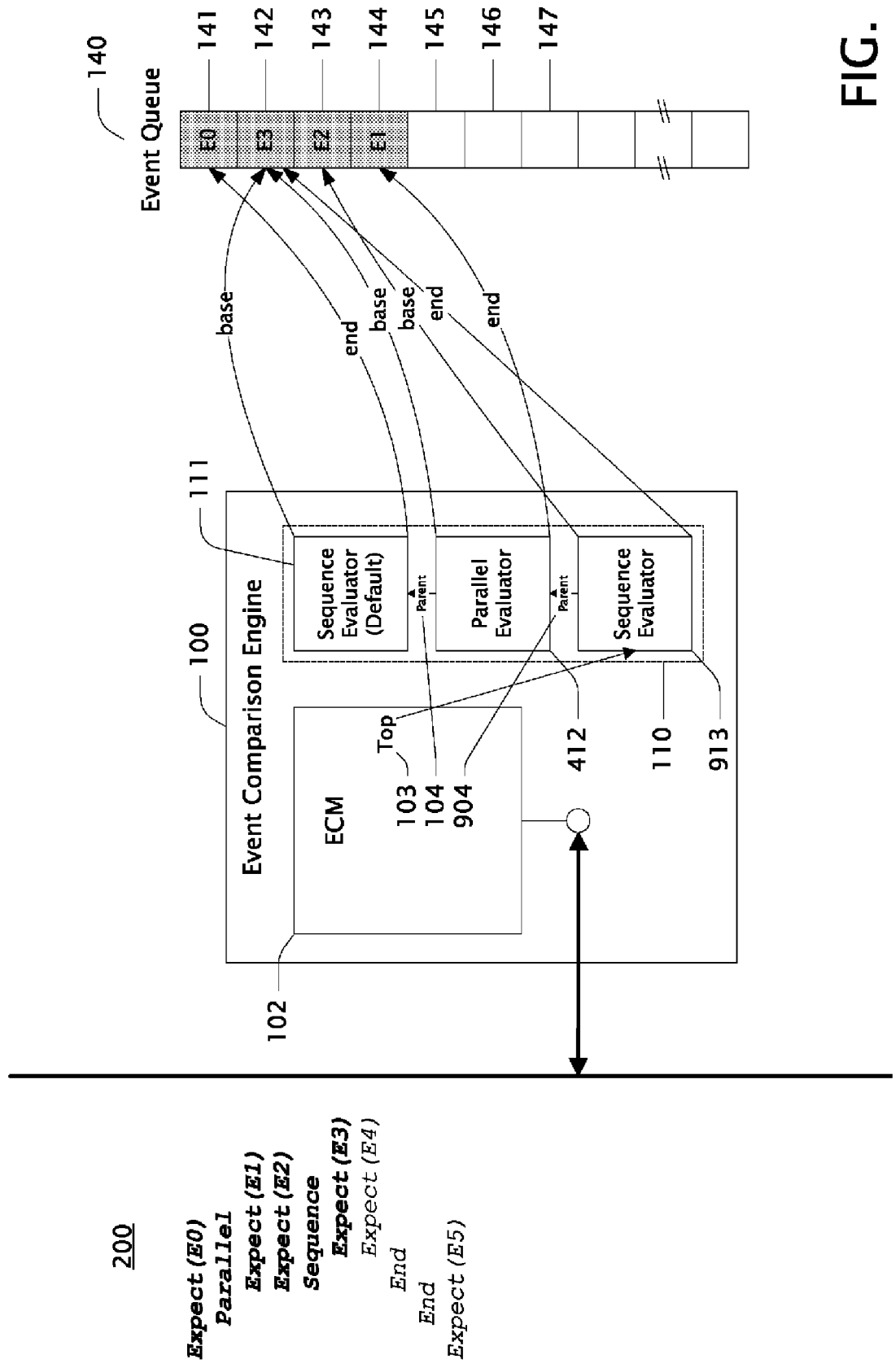

FIG. 10 is a block diagram illustrating a portion of the example test method and showing operations of an example Expect (E3) method invocation responsive to completion of the previous method invocation. Note that the Expect (E3) line of list 200 is bold indicating the method invocation. Accordingly, ECE 100 inspects event queue 140 and finds matching event E3 at position 142. Given the matching event, the end pointer of sequence evaluator 913 is set to point to position 142, the position of matching event E3, and the base pointer of sequence evaluator 913 is set to point to the position following that of the end pointer, position 143. Further, matching event E3 at position 142 is marked as matching, as indicated by the gray shading in position 142. Finally, ECE 100 typically returns a success indicator to its caller indicating that matching event E3 was found corresponding to the Expect (E3) call, thus completing the Expect (E3) method invocation. The example test method typically continues as described in connection with FIG. 11.

Figure 11:
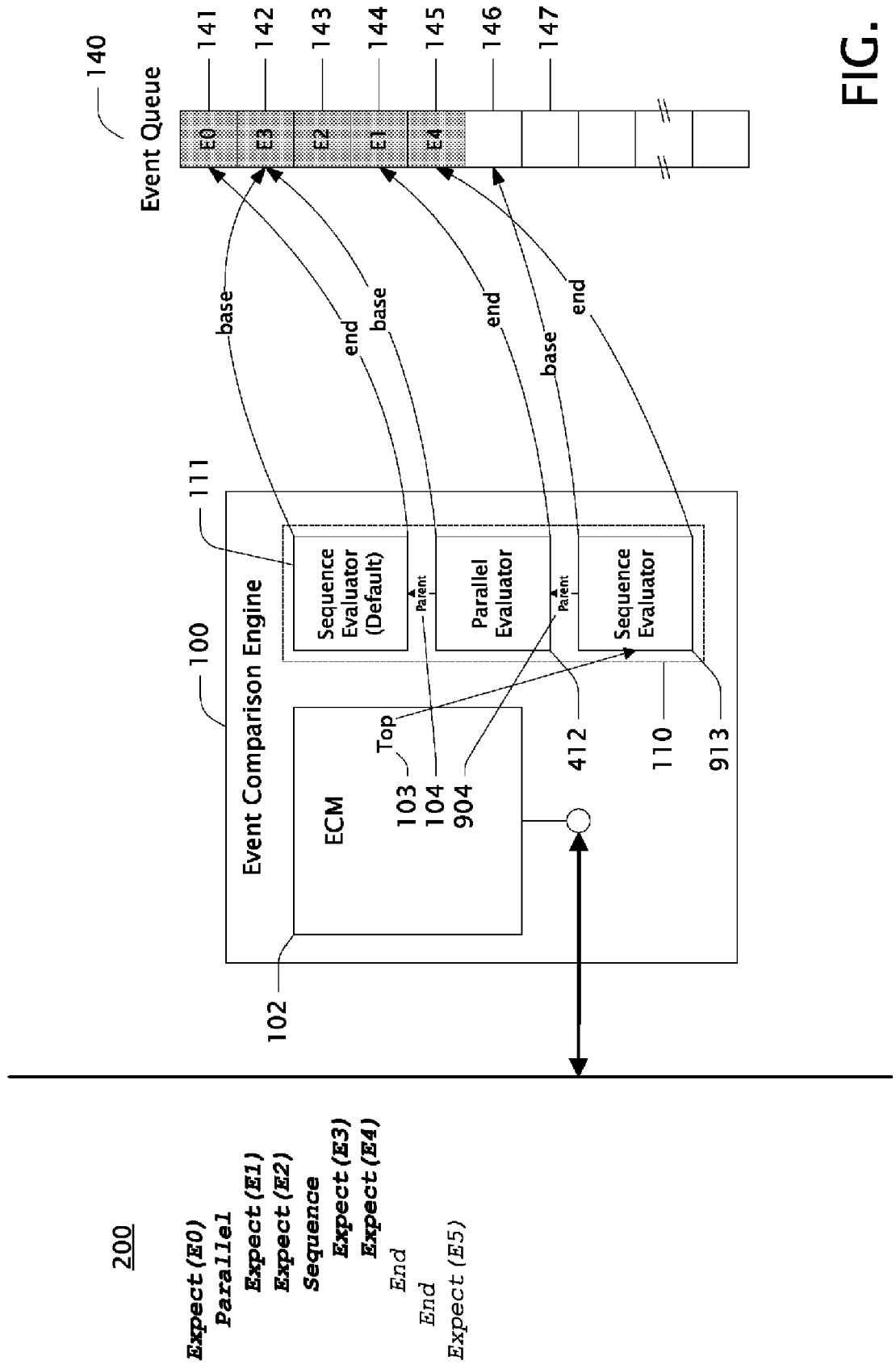

FIG. 11 is a block diagram illustrating a portion of the example test method and showing arrival of an example E4 event and operations of an example Expect (E4) method invocation responsive to completion of the previous method invocation. Note that the Expect (E4) line of list 200 is bold indicating the method invocation. Accordingly, ECE 100 inspects event queue 140 and finds matching event E4 at position 145. Given the matching event, the end pointer of sequence evaluator 913 is set to point to position 145, the position of matching event E4, and the base pointer of sequence evaluator 913 is set to point to the position following that of the end pointer, position 146. Further, matching event E4 at position 145 is marked as matching, as indicated by the gray shading in position 145. Finally, ECE 100 typically returns a success indicator to its caller indicating that matching event E4 was found corresponding to the Expect (E4) call, thus completing the Expect (E4) method invocation. The example test method typically continues as described in connection with FIG. 12.

Figure 12:
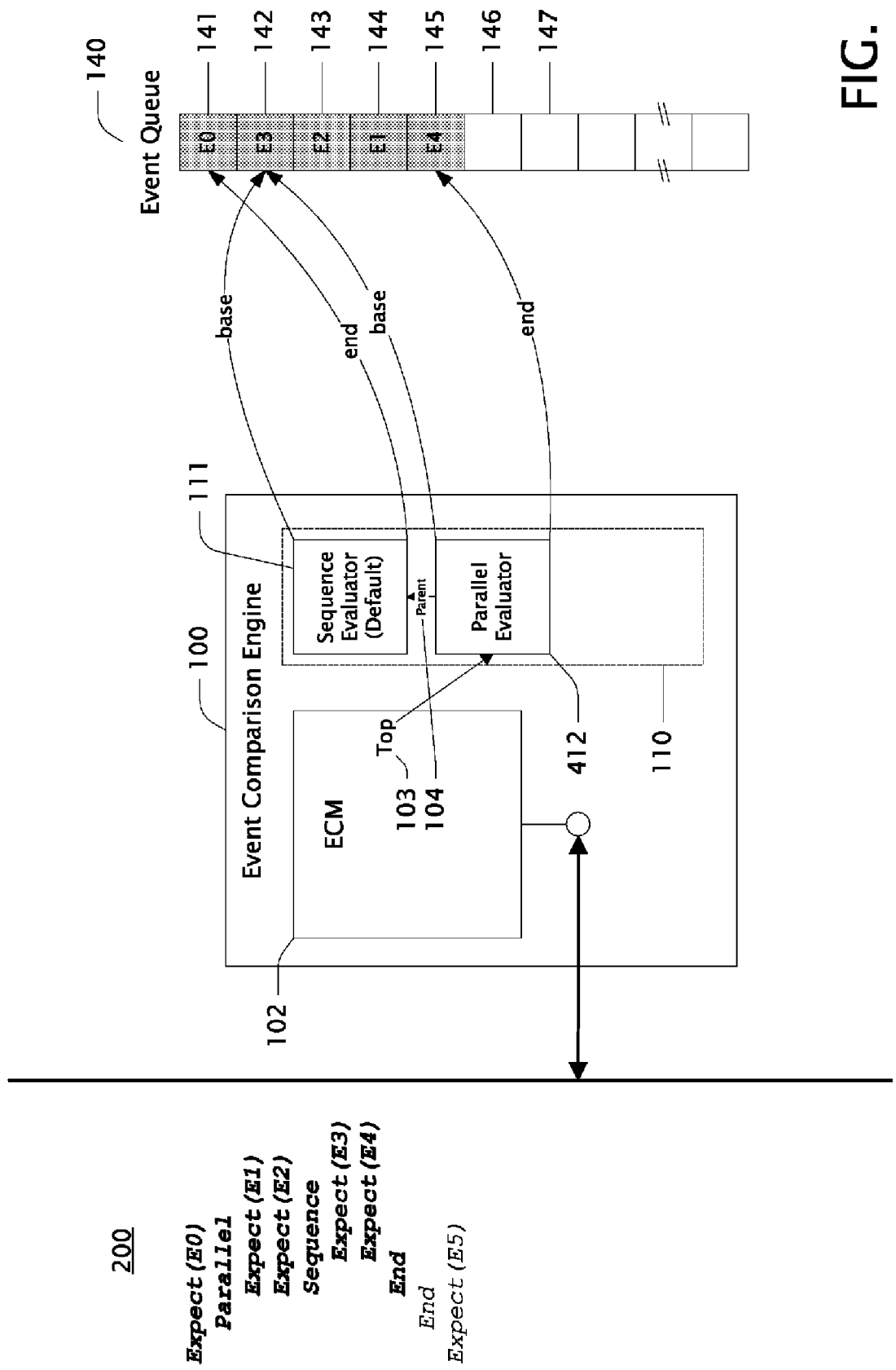

FIG. 12 is a block diagram illustrating a portion of the example test method and showing operations of an example End method invocation corresponding to a previous Sequence method invocation and responsive to completion of the previous method invocation. This example End method invocation corresponds to the previous Sequence method invocation and shown in list 200. Note that the first End line of list 200 is bold indicating the method invocation. Accordingly, ECE 100 pops sequence evaluator 913 of FIG. 11 off evaluator stack 110, sets top pointer 103 to point to parallel evaluator 412, and sets the end pointer of popped evaluator 913's parent evaluator 412 to point to the same position as the end pointer of popped sequence evaluator 913, which is position 145. The base pointer of parallel evaluator 412 remains unchanged. The example test method typically continues as described in connection with FIG. 13.

In general, when any type of evaluator (sequence or parallel) is popped off an evaluator stack then the end pointer of its parent evaluator is set to point to the same position in the event queue as that of the end pointer of the popped evaluator. If the parent evaluator is a parallel evaluator, then the parent parallel evaluator's base pointer remains unchanged. If the parent evaluator is a sequence evaluator, then the parent sequence evaluator's base pointer is set to the position in the event queue following that of the popped sequence evaluator's end pointer. Further, the top pointer of the event comparison engine is set to point to the parent evaluator of the popped sequence evaluator.

Figure 13:
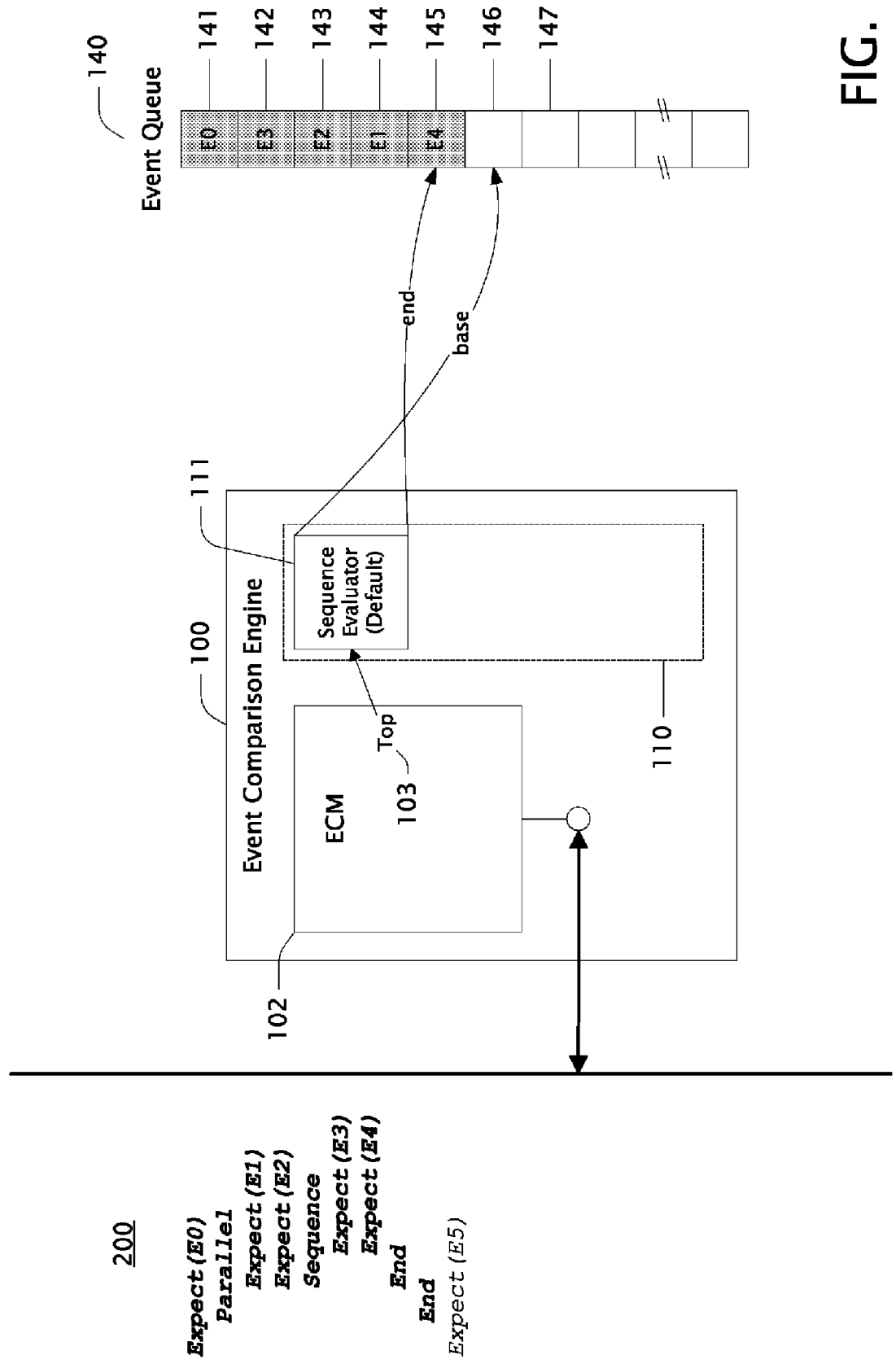

FIG. 13 is a block diagram illustrating a portion of the example test method and showing operations of an example End method invocation corresponding to a previous Parallel method invocation and responsive to completion of the previous method invocation. This example End method invocation corresponds to the previous Parallel method invocation and shown in list 200. Note that the second End line of list 200 is bold indicating the method invocation. Accordingly, ECE 100 pops parallel evaluator 412 of FIG. 12 off evaluator stack 110, sets top pointer 103 to point to default sequence evaluator 111, and sets the end pointer of popped evaluator 412's parent evaluator 111 to point to the same position as the end pointer of popped parallel evaluator 913, which is position 145. The base pointer of sequence evaluator 111 is set to point to the position following that of the end pointer, position 146. The example test method typically continues as described in connection with FIG. 14.

Figure 14:
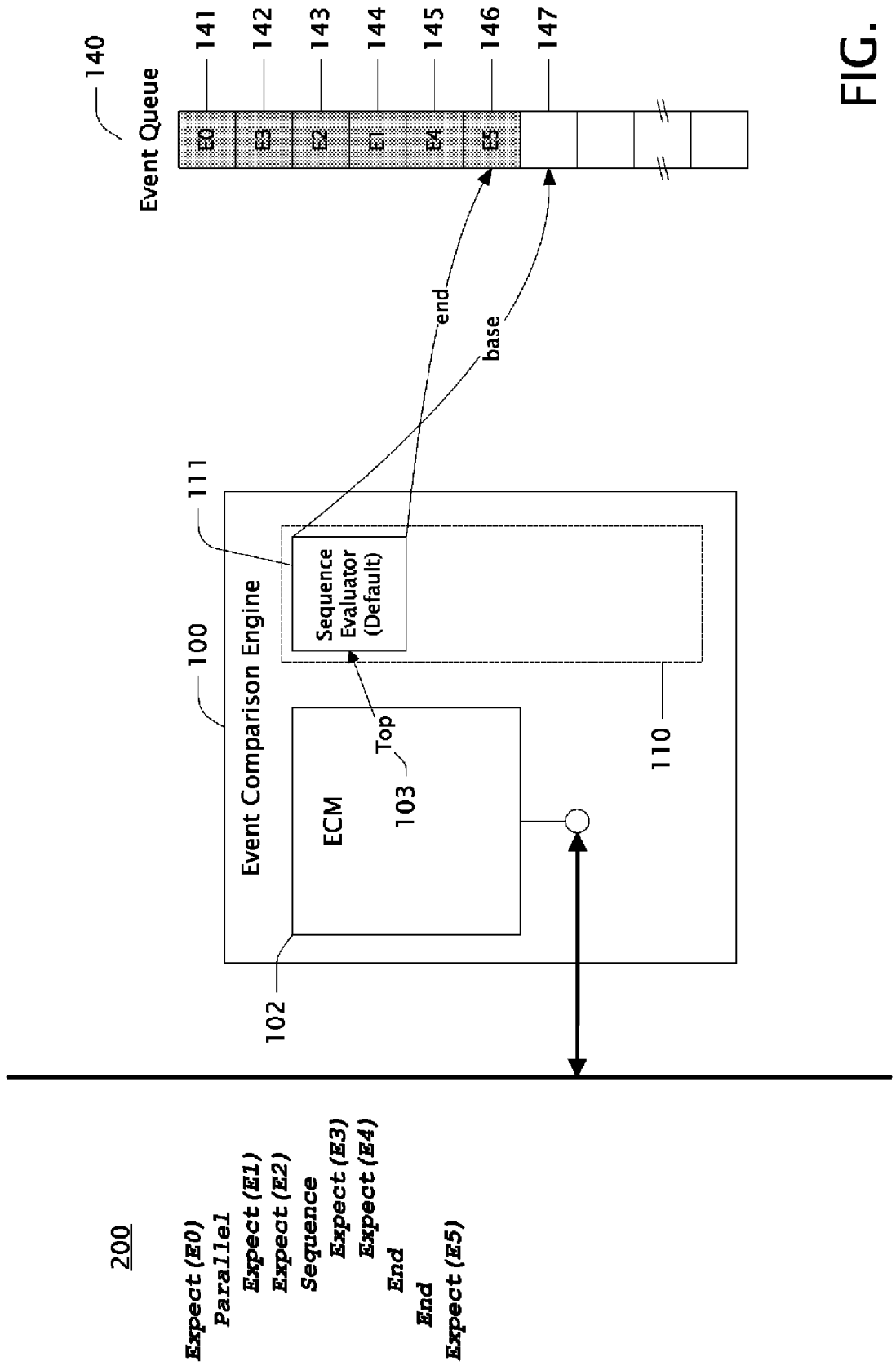

FIG. 14 is a block diagram illustrating a portion of the example test method and showing arrival of an example E5 event and operations of an example Expect (E5) method invocation responsive to completion of the previous method invocation. Note that the Expect (E5) line of list 200 is bold indicating the method invocation. Accordingly, ECE 100 inspects event queue 140 and finds matching event E5 at position 146. Given the matching event, the end pointer of sequence evaluator 111 is set to point to position 146, the position of matching event E5, and the base pointer of sequence evaluator 111 is set to point to the position following that of the end pointer, position 147. Further, matching event E5 at position 146 is marked as matching, as indicated by the gray shading in position 146. Finally, ECE 100 typically returns a success indicator to its caller indicating that matching event E5 was found corresponding to the Expect (E5) call, thus completing the Expect (E5) method invocation. At this point, the example test method typically inspects event queue 140 for any unmarked events as described in connection with FIG. 15.

Figure 15:
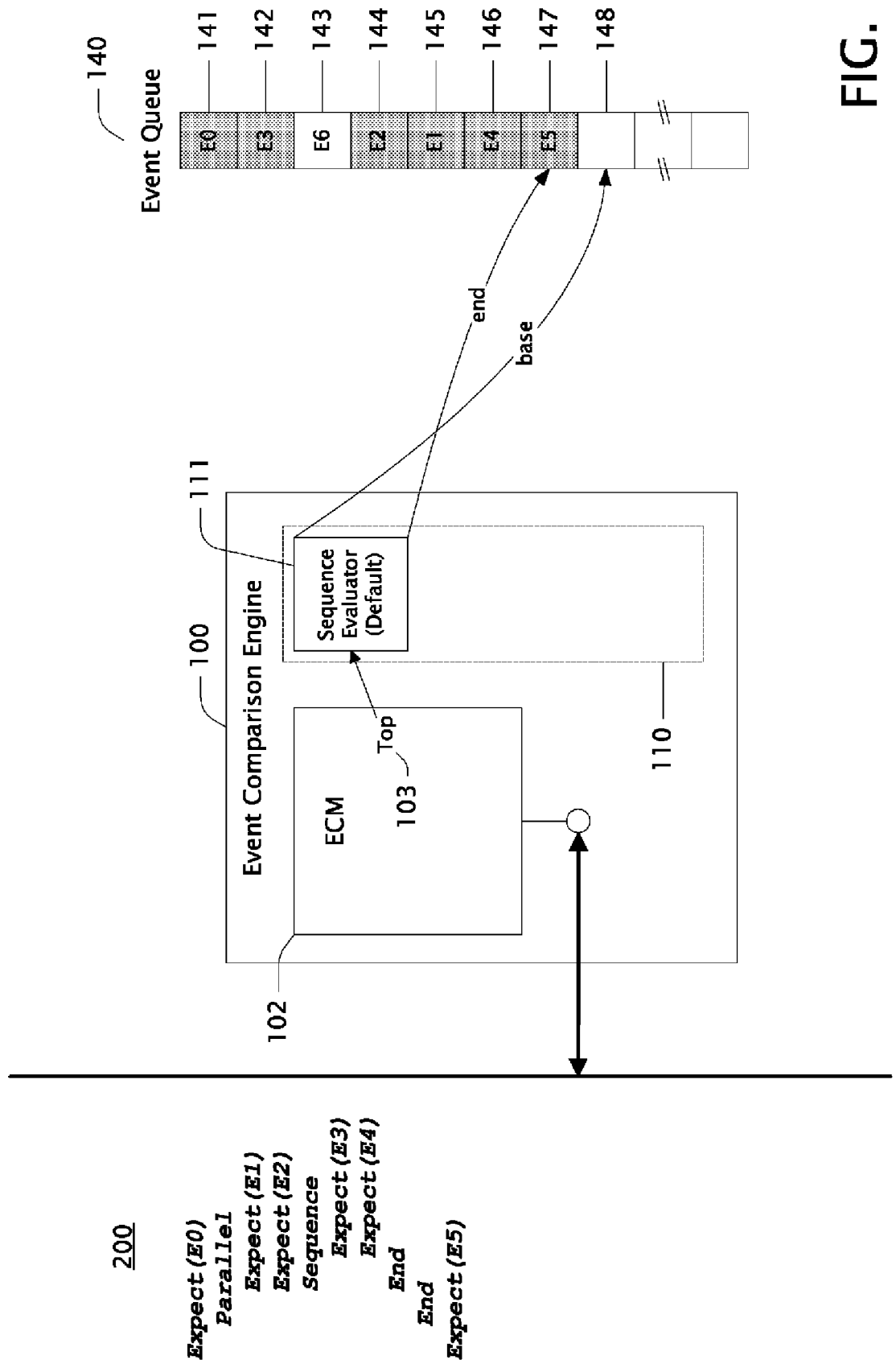
FIG. 15 is a block diagram illustrating a portion of the example test method and showing a variation of events in the event queue including an example unexpected event E6.

FIG. 15 is a block diagram illustrating a portion of the example test method and showing a variation of events in the event queue 140 including an example unexpected event E6. In this example, unexpected event E6 is shown having arrived after event E3 and before event E2. Note that event E6 is not marked as indicating by not being grayed out as events E0 through E5. As can be seen by list 200, event E6 is not expected and therefore represents an event that should not have occurred. For example, event E6 may indicate the deletion of a file that should not have been deleted, or any other activity, state change, or the like of interest. When testing a target system, detecting such unexpected events can be as important as ensuring expected events occur. Such unexpected events may be detected during an ExpectNothing (time) method operation. Alternatively, once all methods of example list 200 have been completed, ECE 100 typically inspects event queue 140 for any unmarked events which indicate unexpected events. Such unexpected events may result in a failure indication being returned by ECE 100. In one example in such a case, ECE 100 also returns information describing the unexpected events.

Figure 16:
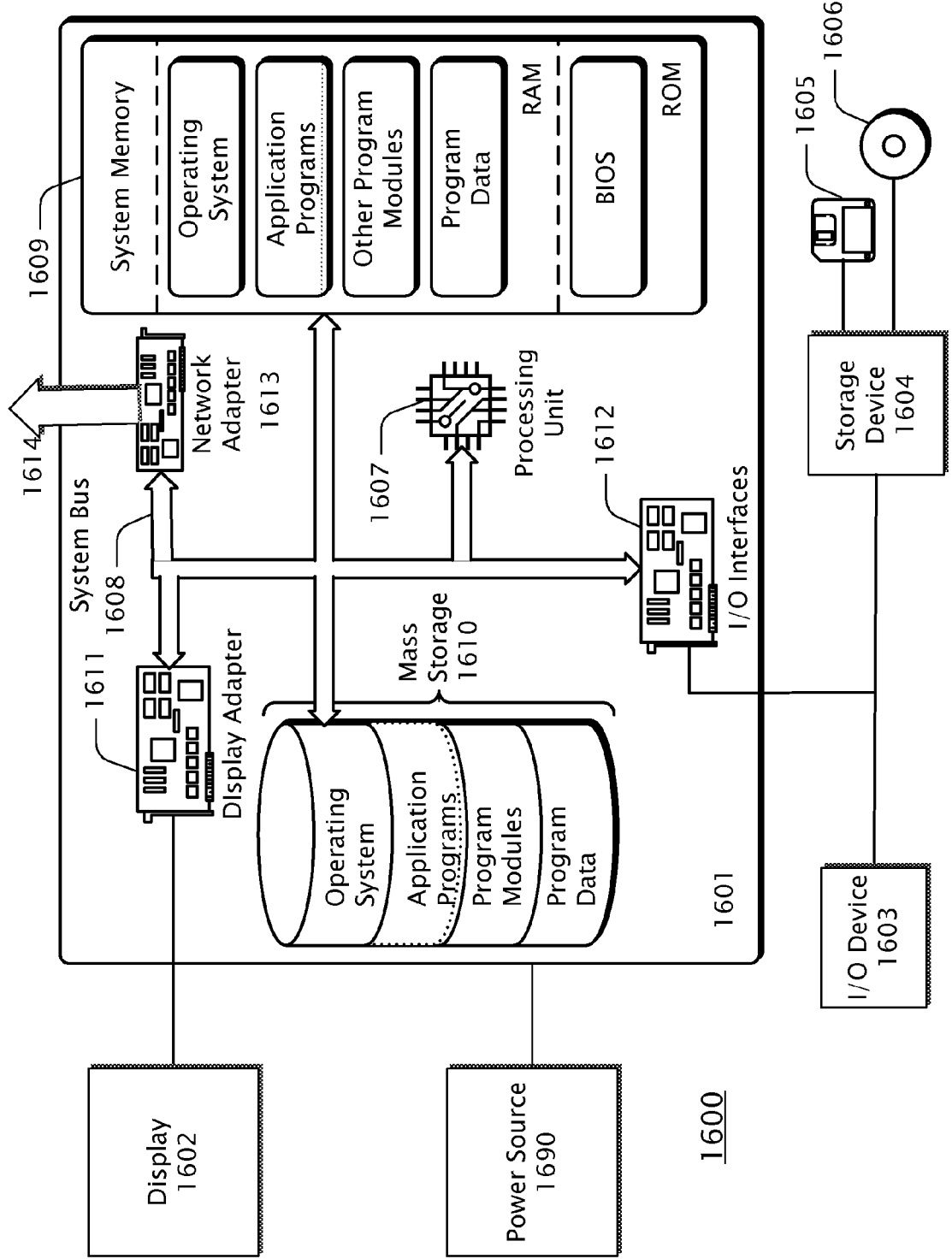
FIG. 16 is a block diagram showing an example computing environment in which the technologies described herein may be implemented.

FIG. 16 is a block diagram showing an example computing environment 1600 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 1600 typically includes a general-purpose computing system in the form of a computing device 1601 coupled to various components, such as peripheral devices 1602, 1603, 1604 and the like. System 1600 may couple to various other components, such as input devices 1603, including voice recognition, touch pads, buttons, keyboards and/or pointing devices, such as a mouse or trackball, via one or more input/output ("I/O") interfaces 1612. The components of computing device 1601 may include one or more processors (including central processing units ("CPU"), graphics processing units ("GPU"), microprocessors ("μP"), and the like) 1607, system memory 1609, and a system bus 1608 that typically couples the various components. Processor 1607 typically processes or executes various computer-executable instructions to control the operation of computing device 1601 and to communicate with other electronic and/or computing devices, systems or environment (not shown) via various communications connections such as a network connection 1614 or the like. System bus 1608 represents any number of several types of bus structures, including a memory bus or memory controller, a peripheral bus, a serial bus, an accelerated graphics port, a processor or local bus using any of a variety of bus architectures, and the like.

System memory 1609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 1609 typically stores data, computer-executable instructions and/or program modules comprising computer-executable instructions that are immediately accessible to and/or presently operated on by one or more of the processors 1607.

Mass storage devices 1604 and 1610 may be coupled to computing device 1601 or incorporated into computing device 1601 via coupling to the system bus. Such mass storage devices 1604 and 1610 may include non-volatile RAM, a magnetic disk drive which reads from and/or writes to a removable, non-volatile magnetic disk (e.g., a "floppy disk") 1605, and/or an optical disk drive that reads from and/or writes to a non-volatile optical disk such as a CD ROM, DVD ROM 1606. Alternatively, a mass storage device, such as hard disk 1610, may include non-removable storage medium. Other mass storage devices may include memory cards, memory sticks, tape storage devices, and the like.

Any number of computer programs, files, data structures, and the like may be stored in mass storage 1610, other storage devices 1604, 1605, 1606 and system memory 1609 (typically limited by available space) including, by way of example and not limitation, operating systems, application programs, data files, directory structures, computer-executable instructions, and the like.

Output components or devices, such as display device 1602, may be coupled to computing device 1601, typically via an interface such as a display adapter 1611. Output device 1602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 1601 to interact with human operators or other machines, systems, computing environments, or the like. A user may interface with computing environment 1600 via any number of different I/O devices 1603 such as a touch pad, buttons, keyboard, mouse, joystick, game pad, data port, and the like. These and other I/O devices may be coupled to processor 1607 via I/O interfaces 1612 which may be coupled to system bus 1608, and/or may be coupled by other interfaces and bus structures, such as a parallel port, game port, universal serial bus ("USB"), fire wire, infrared ("IR") port, and the like.

Computing device 1601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 1601 may be coupled to a network via network adapter 1613 or the like, or, alternatively, via a modem, digital subscriber line ("DSL") link, integrated services digital network ("ISDN") link, Internet link, wireless link, or the like.

Communications connection 1614, such as a network connection, typically provides a coupling to communications media, such as a network. Communications media typically provide computer-readable and computer-executable instructions, data structures, files, program modules and other data using a modulated data signal, such as a carrier wave or other transport mechanism.

The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 1690, such as a battery or a power supply, typically provides power for portions or all of computing environment 1600. In the case of the computing environment 1600 being a mobile device or portable device or the like, power source 1690 may be a battery. Alternatively, in the case computing environment 1600 is a desktop computer or server or the like, power source 1690 may be a power supply designed to connect to an alternating current ("AC") source, such as via a wall outlet.

Some mobile devices may not include many of the components described in connection with FIG. 16. For example, an electronic badge may be comprised of a coil of wire along with a simple processing unit 1607 or the like, the coil configured to act as power source 1690 when in proximity to a card reader device or the like. Such a coil may also be configure to act as an antenna coupled to the processing unit 1607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 1602, I/O device 1603, or many of the other components described in connection with FIG. 16. Other mobile devices that may not include many of the components described in connection with FIG. 16, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. An event comparison system comprising:
   a computing device;
   an event comparison manager implemented at least in part by the computing device, comprising an evaluator stack, and configured for accepting method calls corresponding to a test case;
   the evaluator stack configured for being initialized by the event comparison manager to include an evaluator, the evaluator stack further configured for supporting sequence evaluators and parallel evaluators being pushed on to and popped off of the evaluator stack, each of the sequence evaluators configured for inspecting a single position on an event queue, and each of the parallel evaluators configured for inspecting a plurality of positions on the event queue; and
   the evaluator configured for inspecting the event queue for an event matching an expected event, the inspecting responsive to an Expect (event) method call wherein an event parameter of the Expect (event) method call describes, the expected event, wherein the evaluator on the evaluator stack is initialized as a sequence evaluator.

2. The system of claim 1 wherein the matching event is of an event type provided by an event monitor monitoring a target system, and wherein the matching event represents a particular activity or state change on the target system.

3. The system of claim 1 wherein if the expected event is found then a success indication is returned, and wherein if the expected event is not found prior to expiration of a time-out period then a failure indication is returned.

4. The system of claim 1 wherein the evaluator includes:
   a parent pointer configured to point to a parent evaluator on the evaluator stack;
   an end pointer configured to point to the matching event in the event queue; and a base pointer configured to point to a position in the event queue.

5. The system of claim 4 wherein the event comparison manager includes a top pointer configured to point to a top evaluator on the evaluator stack.

6. The system of claim 5 wherein the event comparison manager is configured to push a new evaluator on to the top of the evaluator stack responsive to a Sequence( ) or a Parallel( ) method call, and to set the top pointer to point to the new evaluator.

7. The system of claim 6, wherein the new evaluator is a sequence evaluator or a parallel evaluator.

8. The system of claim 6 wherein the event comparison manager is configured to pop the new evaluator off of the evaluator stack responsive to an End( ) method call, and to set the top pointer to the top evaluator on the evaluator stack.

9. The system of claim 1 wherein if any event arrives in the event queue during operation of an ExpectNothing (time) method then a failure indication is returned.

10. A method for testing a target system, the method comprising:
    initializing, by a computing device, a sequence evaluator on an evaluator stack, and a base pointer of the sequence evaluator to point to a first position of an event queue, and an end pointer of the sequence evaluator to indicate no matching event, the evaluator stack supporting sequence evaluators and parallel evaluators being pushed on to and popped off of the evaluator stack, each of the sequence evaluators inspecting a single position on the event queue, and each of the parallel evaluators inspecting a plurality of positions on the event queue;
    setting, by the computing device, a top pointer to point to the sequence evaluator on the evaluator stack;
    upon arrival of an event E in the event queue within a time-out period A, determining, by the computing device, if the event E corresponds to an expected event P; and
    if the event E corresponds to the expected event P, returning a success indication, and setting the end pointer of the sequence evaluator to point to the event E in the event queue, and setting the base pointer of the sequence evaluator to point to a position in the event queue immediately following that of the event E in the event queue, and marking the event E.

11. The method of claim 10 further comprising:
    pushing a parallel evaluator on to the evaluator stack wherein a parent evaluator on the evaluator stack is the immediate parent evaluator of the parallel evaluator;
    setting the top pointer to point to the parallel evaluator on the evaluator stack;
    setting a parent pointer of the parallel evaluator to point to the parent evaluator;
    and setting a base pointer of the parallel evaluator to point to a same position in the event queue as that of a base pointer of the parent evaluator.

12. The method of claim 11 further comprising:
    upon arrival of an event H in the event queue within a time-out period B, determining if the event H corresponds to an expected event Q; and
    if the event H matches the expected event Q, returning a success indication, and setting an end pointer of the parallel evaluator to point to the event H in the event queue unless the end pointer of the parallel evaluator was already set to point to a previous matching event, and leaving the base pointer of the parallel evaluator unchanged, and marking the event H.

13. The method of claim 10 further comprising:
    popping an evaluator x off of the evaluator stack wherein a parent evaluator on the evaluator stack is the immediate parent evaluator of the evaluator x;
    setting an end pointer of the parent evaluator to point to a same position in the event queue as that of an end pointer of the evaluator x;
    if the parent evaluator is a parallel evaluator, leaving a base pointer of the parent evaluator unchanged;
    if the parent evaluator is a sequence evaluator, setting the base pointer of the parent evaluator to point to a position in the event queue immediately following that of the end pointer of the evaluator x; and setting the top pointer to the parent evaluator on the evaluator stack.

14. The method of claim 10 further comprising:
    inspecting the event queue for an un-marked event; and if the un-marked event is found, returning a failure indication.

15. The method of claim 10 wherein the event E does not correspond to the expected event P if an event type of event E does not match an event type of the expected event P.

16. The method of claim 15 wherein the event E does not correspond to the expected event P if a specified event data of event E does not match specified event data of the expected event P.

17. At least one computer-readable media that is not a carrier wave or signal per se, the at least one computer-readable media storing computer-executable instructions that, when executed by a computing device, cause the computer device to perform a method for testing a target system, the method comprising:
- initializing a sequence evaluator on an evaluator stack, and a base pointer of the sequence evaluator to point to a first position of an event queue, and an end pointer of the sequence evaluator to indicate no matching event, the evaluator stack supporting sequence evaluators and parallel evaluators being pushed on to and popped off of the evaluator stack, each of the sequence evaluators inspecting a single position on the event queue, and each of the parallel evaluators inspecting a plurality of positions on the event queue;
- setting a top pointer to point to the sequence evaluator on the evaluator stack;
- upon arrival of an event E in the event queue within a time-out period A, determining if the event E corresponds to an expected event P; and
- if the event E corresponds to the expected event P, returning a success indication, and setting the end pointer of the sequence evaluator to point to the event E in the event queue, and setting the base pointer of the sequence evaluator to point to a position in the event queue immediately following that of the event E in the event queue, and marking the event E.

18. The computer-readable medium of claim 17, the method further comprising:
- pushing a parallel evaluator on to the evaluator stack wherein a parent evaluator on the evaluator stack is the immediate parent evaluator of the parallel evaluator;
- setting the top pointer to point to the parallel evaluator on the evaluator stack;
- setting a parent pointer of the parallel evaluator to point to the parent evaluator;
- and setting a base pointer of the parallel evaluator to point to a same position in the event queue as that of a base pointer of the parent evaluator.

19. The computer-readable medium of claim 18, the method further comprising:
- upon arrival of an event H in the event queue within a time-out period B, determining if the event H corresponds to an expected event Q; and
- if the event H matches the expected event Q, returning a success indication, and setting an end pointer of the parallel evaluator to point to the event H in the event queue unless the end pointer of the parallel evaluator was already set to point to a previous matching event, and leaving the base pointer of the parallel evaluator unchanged, and marking the event H.

* * * * *